United States Patent

[11] 3,597,574

| [72] | Inventor | Paul M. Erlandson<br>Palos Park, Ill. |
|---|---|---|
| [21] | Appl. No. | 796,799 |
| [22] | Filed | Feb. 5, 1969 |
| [45] | Patented | Aug. 3, 1971 |
| [73] | Assignee | Continental Can Company, Inc<br>New York, N.Y. |

[54] SURFACE TREATMENT FOR WELDING
7 Claims, 4 Drawing Figs.

[52] U.S. Cl. .................................................. 219/105,
219/482, 219/67, 219/93, 219/117
[51] Int. Cl. .................................................. B23k 11/02
[50] Field of Search............................................ 219/105,
67, 78, 81—83, 91, 93, 117; 228/24; 29/482, 483,
488

[56] References Cited
UNITED STATES PATENTS

| 2,287,540 | 6/1942 | Vang............................ | 219/105 X |
| 2,096,623 | 10/1937 | Almdale....................... | 219/93 X |
| 2,897,340 | 7/1959 | Krieger........................ | 219/93 X |
| 2,999,146 | 9/1961 | Kaplan et al.................. | 219/93 |
| 3,228,103 | 1/1966 | Shewmon...................... | 29/488 X |
| 3,400,449 | 9/1968 | Maquire et al................. | 29/488 X |

Primary Examiner—R. F. Staubly
Assistant Examiner—L. A. Schutzman
Attorney—Diller, Brown, Ramik & Holt ABSTRACT: This disclosure relates to electrical resistance welding and more particularly to the surface treatment of metal members along the faying and electrode engageable surfaces thereof. The faying surfaces are embossed or formed by a high energy rate method so as to be of a uniform finish whereby there will be a predetermined resistance between engaged faying surfaces thereby providing for a better control on the power required for forming a weld and the resultant metal weld.

PATENTED AUG 3 1971 3,597,574

INVENTOR
PAUL M. ERLANDSON

BY Mason, Porter, Diller & Brown
ATTORNEYS

SURFACE TREATMENT FOR WELDING

This invention particularly relates to the treatment of surfaces of metal members which are to be electrically resistance welded together. The invention particularly relates to the welding together of edge portions of relatively thin sheet metal to form a continuous seam utilizing roller electrodes.

In addition to the problem of assuring a good continuous weld, there is also the problem of power loss and electrode life which must be considered from an economical standpoint. It will be readily apparent that the pressures over the area contact between electrode and workpieces must be limited in order to prevent undue electrode deterioration. On the other hand, if a proper resistance weld is to be formed wherein melting is held to a minimum or is avoided, it is necessary that the faying surfaces of the sheet metal being welded together must have good contact resistance so as to obtain the desired combination of pressure and heat to perform the intended weld which is preferably of the solid-state type or a close proximation thereof.

In the past, the surfaces have been prepared by grinding or by rotary machine tool application. Such procedures have not provided either the desired uniformity of finish or the smoothness of finish desired. Furthermore, such procedures have also left the minute depressions in the metal filled with the dust resulting from the grinding or machining operation with the result that the desired contact between faying surfaces has not been obtained.

In accordance with this invention, it is proposed to emboss at least the faying surfaces of the sheet metal to be welded together so as to break up any surface oxides, etc., and at the same time to increase the smoothness of the surface which is being treated while showing the uniformity of the finish thereof. It is preferred that the embossing be accomplished by high energy rate metal-forming process both for the purpose of providing best control for the embossed finish, but also in order to assure the rapid embossing of the metal sheet.

With the above and other objects in view that will hereinafter appear, the nature of the invention will be more clearly understood by reference to the following detailed description, the appended claimed subject matter, and the several views illustrated in the accompanying drawing.

Figure 2:
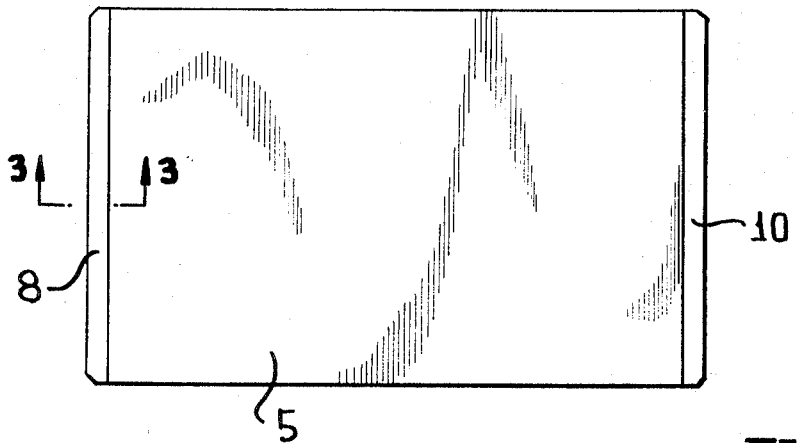
FIG. 2 is a plan view of the can body blank showing generally the extent of the treated edge portions, the edge portions being widened for purposes of clarity.

Referring now to FIG. 2 in particular, it will be seen that there is illustrated a can body blank 5 which is adapted to be rolled into a generally cylindrical form and then have the edges thereof continuously welded together in overlapped relation. This is accomplished by first tacking together the overlapped edges of the body blank 5 and then passing the overlapped edges between a pair of roller electrodes 6 and 7 in the manner best shown in FIG. 4.

Figure 4:
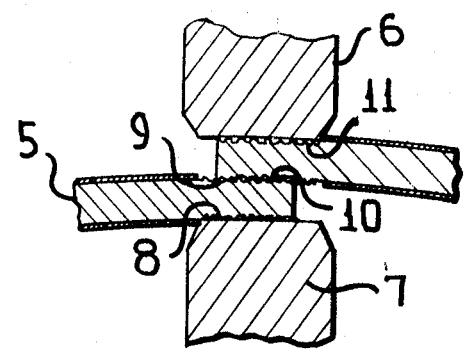
FIG. 4 is a schematic sectional view showing the manner in which the treated edge portions of the body blank are continuously welded together by means of a pair of roller electrodes.

It will be readily apparent from FIG. 4 that the can body blank 5 has four critical edge surfaces. These include an inner electrode engageable surface 8, an inner faying surface 9, an outer faying surface 10 and an outer electrode engageable surface 11. It will be readily apparent that in the connections between the electrodes 6 and 7 and the body blank 5, three electrical joints are formed. These include the joint between the electrode 7 and the inner electrode engageable surface 8, the joint between the faying surfaces 9 and 10, and the joint between the outer electrode engageable surface 11 and the electrode 6. It will also be apparent that in a given electrical welding system, these joints are the only variables and in order to obtain better controlled welding operations, control of the resistances of these joints is not only highly desirable, but also necessary.

In accordance with this invention, it is proposed to control the electrical resistances of the three above-mentioned joints, particularly that between the faying surfaces 9 and 10, by maintaining a fine control on the surface roughness of the edge surface portions of the body blank. It has been found that this can be best accomplished by embossing the surfaces. While any suitable embossing operation which is of a control uniformity may be utilized, it is preferred that the embossing be performed by means of a high energy rate metal forming process.

Figure 1:
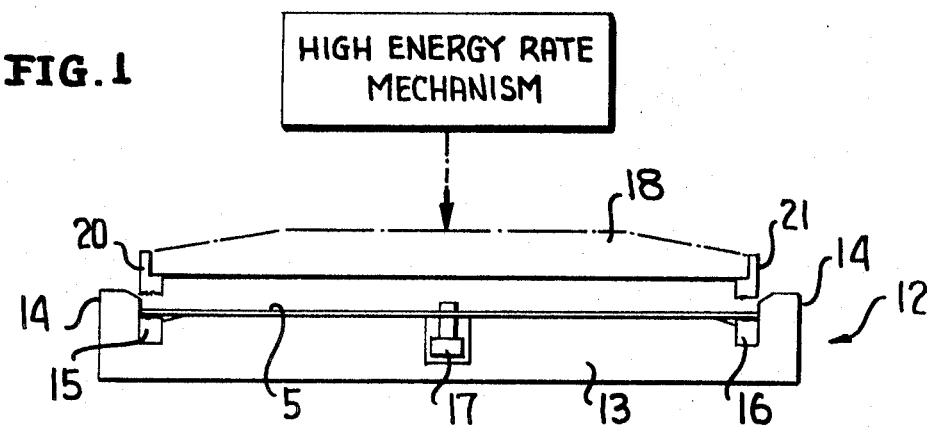
FIG. 1 is an elevational view of an apparatus for embossing edge portions of a metal can by the blank utilizing a high energy rate metal forming process.

Referring now to FIG. 1, it will be seen that there is schematically illustrated a high energy rate metal-forming apparatus which will perform the desired embossing operations. The apparatus is generally referred to by the numeral 12 and includes a base 18 having upstanding edge guide portions 14 for controlling the position of a body blank 5 or like sheet metal member which is to have the edges thereof treated. The base 13 is provided with a pair of hardened inserts 15 and 16 which have the upper surfaces thereof configurated so as to emboss the edge portion surfaces 9 and 11, respectively, of the body blank 5.

The body blank 5 may be conveyed to, positioned on and removed from a base 13 by means of a suitable feed mechanism 17 which may be of any conventional type including the type presently being utilized in can body-forming mechanisms.

The apparatus 12 also includes a hammer member 18 which carries along the opposite sides thereof hardened removable die members 20 and 21 which are vertically aligned with the inserts of die members 15 and 16, respectively. The hammer 18 is vertically reciprocated in any suitable manner, but preferably by means of a high energy rate actuating mechanism, such as an electrohydraulic actuator.

It will be readily apparent from FIG. 1 that when the body blank 5 is positioned within the apparatus 12, the hammer 18 will be instantaneously moved downwardly and all four edge surface portions of the body blank 5 treated at the same time. The operation of the apparatus 12 may by synchronized with the feeding of the body blanks 5 to the body forming and welding machine. Embossing may be done "on the fly" if a very high speed electrohydraulic system is employed.

At this time it is pointed out that while it is the purpose of this invention to obtain uniformity of surface finish of the edge portions of the body blank 5, it is not absolutely necessary that the surfaces 8 and 11 thereof be treated in the manner described herein. However, under normal conditions, the four surfaces would all be treated inasmuch as this may be readily accomplished in a single operation.

Figure 3:
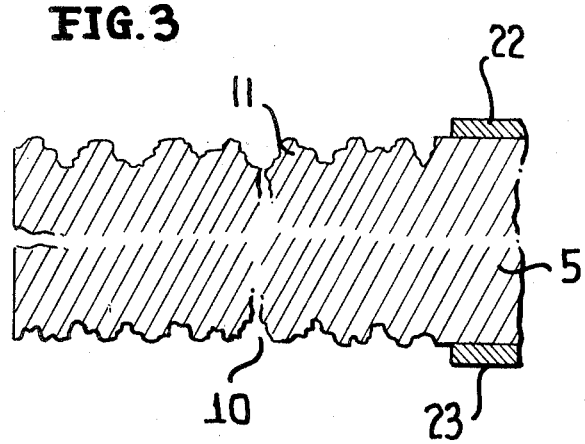
FIG. 3 is an enlarged fragmentary vertical sectional view taken along the line 3-3 of FIG. 2 and schematically shows the finish of the embossed edge portions of the body blank.

With particular reference to FIG. 3 and general reference to FIG. 4, it is to be understood that in addition to design uniformity of finish of the surfaces of the edge portions of the body blank 5, it is preferred that the faying surfaces 9 and 10 have an extremely fine finish as compared to that which is normally permissible. It has been found that a finish on the order of 1.0 micron or less provides for a best combination of pressure and heat required to form a weld or at the same time provides for a maximum power efficiency. When available, a finish on the order of 0.2 micron would be desired for the faying surfaces 9 and 10.

When it is found desirable to emboss the surfaces 8 and 11, the embossment should be of a rougher pattern to lower the contact resistance of the surfaces 8 and 11 with the roller electrodes 7 and 6, respectively.

It is also pointed out at this time that no specific pattern of embossment has been illustrated and no specific pattern is required. It is merely necessary that the pattern be determined and thereafter the same pattern to be utilized so that uniformity of resistance will be obtained.

Referring once again to FIG. 3 in particular, it will be seen that the opposite surfaces of the body blank 5 are provided with suitable coatings 22 and 23. These coatings are protective coatings and need not extend into the embossed areas. If they do, they must be removed prior to the embossment.

It is further pointed out here that in certain instances it may be desirable to provide other treatment for the embossed surfaces, including chemical treatment. It will be readily apparent that all loose or thick, or gross surface deposits, whether oxides, oil, scale, etc., must be removed. In addition, it may be desirable to provide chemical treatment which will create conditions to insure further uniformity of resistance to contact areas of the body blank.

Although the invention has only been schematically illustrated and described, it is readily apparent that the degree and design of embossment will be varied to meet one's own particular requirements and therefore no further description hereof is necessary. Further, although only one preferred embodiment of the invention has been specifically illustrated and described herein, it is to be understood that minor variations may be made in the invention without departing from the spirit thereof.

I claim:

1. In a process of providing uniform resistance welds between metal members which includes the steps of preparing faying surfaces of the members, bringing the faying surfaces together under a controlled pressure loading, and coupling the members to a source of electrical energy to resistance heat and weld together the members along the faying surfaces; the improvement residing in embossing the faying surface to an overall uniform roughness.

2. The process of claim 1 wherein the faying surfaces are prepared by high energy rate metal forming.

3. The process of claim 1 wherein the faying surfaces have a finish on the order of 1 micron and less centerline average.

4. The process of claim 1 wherein the faying surfaces have a finish on the order of 0.2 micron centerline average.

5. The process of claim 1 wherein electrode engageable surfaces of the members remote from the faying surfaces are also prepared to a uniform roughness of a greater roughness than the roughness of the faying surfaces.

6. The method of claim 5 wherein each faying surface and the associated electrode engageable surface are simultaneously formed in a single operation.

7. The process of claim 1 wherein any protective coating existing on the metal members is removed prior to the preparing of the faying surfaces to a uniform roughness.